United States Patent [19]
Muzzy et al.

[11] Patent Number: 5,198,281
[45] Date of Patent: Mar. 30, 1993

[54] NON-WOVEN FLEXIBLE MULTIPLY TOWPREG FABRIC

[75] Inventors: John D. Muzzy; Jonathan S. Colton, both of Atlanta, Ga.

[73] Assignee: Georgia Tech Research Corporation, Atlanta, Ga.

[21] Appl. No.: 848,093

[22] Filed: Mar. 9, 1992

Related U.S. Application Data

[63] Continuation-in-part of Ser. No. 339,297, Apr. 17, 1989, Pat. No. 5,094,883, and a continuation-in-part of Ser. No. 700,559, May 15, 1991.

[51] Int. Cl.⁵ .................................................. B32B 3/06
[52] U.S. Cl. ..................................... 428/102; 156/148; 156/163; 156/180; 156/290; 156/308.2; 428/105; 428/114; 428/198; 428/296; 428/300
[58] Field of Search ............... 428/102, 105, 114, 198, 428/296, 300; 156/148, 163, 180, 290, 308.2; 264/136

[56] References Cited

U.S. PATENT DOCUMENTS

| | | | |
|---|---|---|---|
| 4,534,919 | 8/1985 | McAhley et al. | 264/136 |
| 4,714,642 | 12/1987 | McAhley et al. | 428/408 |
| 4,714,648 | 12/1987 | Nagato | 428/408 |
| 5,122,417 | 6/1992 | Murakami et al. | 428/408 |
| 5,128,199 | 7/1992 | Iyer et al. | 428/408 |

*Primary Examiner*—James J. Bell
*Attorney, Agent, or Firm*—Hurt, Richardson, Garner, Todd & Cadenhead

[57] ABSTRACT

A non-woven towpreg fabric and a method of production therefor. The non-woven towpreg fabric is fabricated from a plurality of flexible, multiply towpregs, comprising towpreg plies which comprise reinforcing filaments substantially wetout by a matrix forming material, which then are bonded together to form the fabric. The method of production for the non-woven towpreg fabric involves spreading the reinforcing filaments, coating the reinforcing filaments with the matrix forming material in a manner causing interfacial adhesion, forming the towpreg plies by heating the matrix forming material until the matrix forming material liquefies and coats the reinforcing filaments, cooling the towpreg plies in a manner while said towpregs remain substantially unconsolidated until the matrix forming material solidifies, overlapping a plurality of the towpreg plies, and bonding the towpreg plies together. Multidimensional fabrics, preforms and composite articles also can be formed by this invention.

31 Claims, 8 Drawing Sheets

NON-WOVEN FLEXIBLE MULTIPLY TOWPREG FABRIC

STATEMENT OF RELATED APPLICATIONS

This application is a continuation-in-part of application Ser. No. 07/339,297, filed on Apr. 17, 1989, now U.S. Pat. No. 5,094,883 and application Ser. No. 07/700,559, filed on May 15, 1991, allowed but not yet issued.

BACKGROUND OF THE INVENTION

1. Field of the Invention

The present invention is directed to a non-woven multiply towpreg fabric and a method of production therefor, and specifically to a non-woven towpreg fabric suitable for further processing to form multi-dimensional fabrics, preforms, and composite structures.

2. Discussion of the Prior Art

Towpreg comprising fibers or filaments combined with a matrix resin are known in the art and typically are called "prepregs". Conventional towpreg consists of hundreds or thousands of fibers or filaments embedded in a continuous mass of the matrix. The reinforcing fibers typically used are available commercially in continuous form in "bundles" of filaments known as "tows", which vary widely in number of filaments per tow. Many matrix resins are available, however two kinds of matrix resin systems dominate the prior art: thermoplastic and partially cured thermoset polymers.

Thermoplastic polymers have been used widely as matrices for towpregs and other composites, and are potentially useful as matrices for advanced composites for aerospace applications. Thermoplastics have advantages over thermosetting materials in fracture toughness, impact strength, and environmental resistance. Thermoplastics also provide prepregs with indefinite shelf life, give the fabricator better quality assurance, and avoid the storage and refrigeration problems associated with thermosetting prepreg. Thermoplastic molecules are tougher than the rigid cross-linked network of the thermosets; few of the toughened thermosets have met the combined requirements of damage tolerance and hot/wet compression strength necessary for use in aerospace composites. The disadvantage of thermoplastic polymers as a composite matrix material is the difficulty of uniformly coating the fibers due to the high viscosity of the molten polymer. Thermoplastic towpreg typically is rigid and is not well-suited for weaving, braiding, or laying up preforms, as the resulting fabrics are stiff. Similarly, the rigidity of thermoplastic towpreg complicates the filament winding and formation of complex shapes; heat must be focused at the point of contact to achieve towpreg conformability during layup.

Thermoset polymers also are used as matrices for towpreg. Towpreg containing thermosetting prepolymers, although relatively flexible, is tacky, thus requiring a protective release coating, which must be removed prior to use. While thermoset towpreg is acceptable for filament winding, its tackiness and the requirement of a protective release coating make thermoset towpreg unfeasible for weaving, braiding, or the production of chopped fiber feed stock for bulk or sheet molding compounds.

Two other types of towpreg are metal matrix towpreg, which is similar to thermoplastic towpreg, and partially cured ceramic towpreg, which is similar to thermoset towpreg. However, due to the limited markets for metal and ceramic composites, these materials are not generally available and have not been the focus of developments in manufacturing technology. Metal and ceramic matrix towpregs can be manufactured in a manner and form analogous to thermoplastic and thermosetting towpregs.

Continuous fiber tow prepregs can be produced by a number of impregnation methods including hot melt, solution, emulsion, slurry, surface polymerization, fiber commingling, film interleaving, electroplating, and dry powder techniques.

In hot melt processing, impregnation may be accomplished by forcing the fiber and resin through a die at high temperature under conditions that create high shear rates. Due to the high temperatures of this process, the thermoplastic material can degrade. Other disadvantages of this process include the high stress applied to the tow and difficulties in impregnating the tow with thermoplastics.

In solution coating, the matrix material is dissolved in solvent and the fiber tow is passed through this solution and then dried to evaporate the solvent. Two disadvantages associated with this process are that thermoplastics usually exhibit limited solubility at high concentration, and most engineering thermoplastics cannot be dissolved in a low boiling-point solvent at room temperature. Additionally, high solution viscosity results in the same impregnation problems as with hot melt, as well as causing the fibers to stick together. Another problem is the difficulty in removing the solvent. Further, traces of solvent left in the towpreg lead to undesirable porosity in the composites.

An emulsion process is one way to apply powdered polymer matrix material with a very small particle size to fiber tow by synthesizing the resin as an aqueous emulsion with a surfactant. The problem with this process is that the removal of the surfactant from the final composite is difficult.

Slurry coating or wet powder processing is a non-solvent coating technique designed to resolve the problem of the insolubility of most thermoplastics in a solvent at room temperature. In slurry coating, the powder is suspended in a liquid medium, generally water, wherein no solvency exists between the resin and the medium, and the fiber bundles are drawn through the slurry. The slurry particulate matrix does not wetout the fiber, resulting in the need for higher pressures to consolidate the matrix and fibers into a composite. This towpreg can be tacky and therefore is not suitable for weaving or braiding. Other disadvantages include the necessity for the removal of the liquid medium, volatiles, and dispersants or surfactants, which are used to form the polymer/liquid colloidal state, the likelihood of aggregates in the slurry caused by poor mixing, and the possibility that polymer particles will settle during processing.

To achieve intimate mixing in emulsion or slurry coating, the particle size of the slurry or emulsion should be smaller than the fiber diameter. For many of the thermoplastics that cannot be made by emulsion or dispersion polymerization, it is extremely difficult to produce such fine powder. Thus, a coarse blend between fibers and particles is obtained. The quality of the blend decreases as the particle size increases, leading to poor matrix distribution in the consolidated composite, and poor composite structure.

In surface polymerization, coating results from the polymerization of the polymer matrix on the fiber substrate. Disadvantages associated with this process include the need to remove undesired materials, such as solvent, inhibitor, or by-products of the polymerization reactions. Surface polymerization only can be conducted by special techniques, such as electropolymerization, which cannot be used to produce many of the polymeric matrices of commercial interest.

In fiber commingling, the polymeric matrix is introduced in fibrous form. Polymeric and reinforcing fibers are mingled as dry blends; however, wetting of the fiber by a process, such as melting the polymer fiber, is deferred until the composite is consolidated. Effective impregnation depends on the degree of randomness of the intermingling of the resin and fiber throughout the system. As no wetting of the reinforcing fibers by the matrix material occurs in this tow, higher pressures are needed to consolidate the towpreg under equivalent processing times and temperatures into a composite, as compared to completely wetted towpreg.

Film casting is one method for producing prepreg that resolves some of the problems associated with hot melt impregnation of thermoplastics. It consists of stacking a film layer of matrix material cast from either hot melt or solution over spread tow. The fibers sandwiched between two films are heated and calendered to force the resin into the fibers.

A flexible metal matrix towpreg has been produced by electroplating by American Cyanamid. Each fiber is completely wet-out and uniformly coated with the metal matrix. This towpreg has desirable properties for weaving, braiding, filament winding, or for conversion to bulk or sheet molding compound feedstocks. Additionally, this towpreg does not require high pressure for consolidation. However, electroplating has a disadvantage in that systems that can be adapted to electroplating are limited. Most ceramic and polymeric matrices of commercial interest cannot be electroplated on reinforcing fibers. As the filaments or fibers comprise one of the electrodes, the reinforcing fiber must be conductive and fibers, such as glass fibers and organic fibers, cannot be electroplated.

Powder coating of tow is the most recent method developed for making prepreg. The significant advantages are that no solvent is required and no high stress is introduced in the process. The ultimate goal for almost all powder coating applications is the ability to deposit a thin, even thickness, high quality coating as efficiently as possible. The powdered resin also must be solid at ambient and elevated storage temperatures, and be capable of melting sharply to low viscosity to permit flow and to penetrate the fiber tow when heated. Dry powder coating has many advantages because the elimination of a wet base, solvent or water, facilitates reclamation of the coating material. This is an important economic advantage that promises a potential 100% utilization of powder plus elimination of expensive solvents that are flushed off and inevitably wasted. Thus, powder coating was conceived and has grown largely on these potential benefits.

Another method of powder coating fibers with matrix is the ATOCHEM method of impregnating fibers with dry thermoplastic polymer powder and then covering the towpreg with a thermoplastic sheath. However, as the matrix is not melted onto the fibers, only fibers in contact with the sheath are wetted with the matrix. Consolidating this composite also requires higher pressures under comparable processing conditions than completely wetout towpreg. Furthermore, as in slurry coating, a fine polymer powder, generally less than 20 microns, is recommended for this process. Producing such fine powder from thermoplastics can be very expensive.

Towpreg must contain sufficient matrix, typically over 25% by volume, to permit consolidation of the components into a substantially void-free composite structure without requiring the incorporation of more matrix material. Linear towpreg can be converted into two and three dimensional product forms by weaving, braiding, filament winding, and other known processes. Alternatively, towpreg can be used to create a discontinuous fiber reinforced feedstock for molding by chopping, cutting, or like known processes.

BRIEF SUMMARY OF THE INVENTION

The limitations and disadvantages of the prior art towpreg are overcome by the non-woven, flexible, multiply towpreg produced according to the present invention, which has the advantages and benefits disclosed in the parent applications in addition to several other advantages. Low cost, 2-dimensional fabrics are produced, which can be used for downstream processing into 2-dimensional and 3-dimensional fabrics, preforms and composite structures. In this regard, the products in this invention are less expensive than braided or woven fabrics produced from flexible multiply towpreg. Using this invention, fabrics with matrices that are solid at room temperature can be flexible, whereas conventional technology produces rigid fabrics.

One novel feature of this invention is the production of non-woven, flexible, multiply towpreg fabric in which both flexibility and significant fiber wetout is achieved using a solid matrix. Typical fabric structures in which both the matrix and reinforcement are present as fibers (cofiber structures), such as commingled, cobundled, or colayered structures, are flexible, but do not exhibit any wetting of the reinforcing fibers as exhibited in this invention. Therefore, such cofiber fabrics require more intensive processing conditions to consolidate when compared to this invention.

The non-woven multiply towpreg fabric according to the present invention, is produced by a four-step process: (1) The tow of reinforcing filaments is spread laterally to expose virtually all of the fibers or filaments to the environment; (2) the matrix material is contacted with the exposed spread filaments in a manner causing interfacial adhesion; (3) substantial cohesion between neighboring plies within a towpreg is prevented by keeping the plies laterally separated until the matrix material solidifies into a non-tacky state, to produce the base towpreg fabric; and (4) forming the base towpreg into the non-woven towpreg fabric of this invention by cohesion methods such as, for example, overlaying, point bonding, or stitching.

A towpreg ply is a separate section of towpreg that is free of voids and separated from neighboring plies for an average axial length of at least about 30 times the thickness of the ply. This geometric separation of non-tacky plies leads to substantially independent flexural deformation of the ply elements. The towpreg has a preferred minimum bending radius of no greater than about 15 mm and an average ply thickness which does not exceed about 100 microns. Although the ply thickness may be limited by the above requirements to be useful in certain applications, it is not necessary to constrain the size of the towpreg, provided the plies comprising the towpreg can act independently.

A multifilament tow is spread to a desired width, typically more than one inch wide, and is coated with a matrix material. The multifilament tow is kept under tension during the coating step to achieve substantial wetout of the filaments. As the matrix material solidifies, individual filaments and bundles of filaments, or plies, are created, with some plies being connected to other plies by interply connectors, typically single filaments. The coated plies have a lower flexural rigidity than a fully consolidated towpreg.

The interconnected towpreg plies and filaments then are overlapped with each other and bonded together to form a fabric. Preferably, two or more layers of towpreg are overlapped to form a fabric with an acceptable basis weight of between about 50 g/m² and about 500 g/m², and preferably between about 150 g/m² and about 350 g/m². Various bonding techniques are suitable for bonding the towpreg plies together, with point bonding by hot melt bonding and stitching being preferred. Typically, hot melt bonding of the overlayed towpregs at selected points is used to bond the towpregs together while still maintaining flexibility. Needle punching, entanglement processes and focused pressing also are suitable bonding techniques.

The various layers of towpreg can be oriented as desired to produce flexible fabrics suitable for different applications. For example, all towpreg plies can be layed unidirectionally so as to produce unidirectional fabric. Alternatively, alternate layers of towpreg can be oriented at different angles from each other so as to produce a multidirectional fabric. For example, the second layer of towpreg can be oriented at 90° from the orientation of the first layer. As is obvious, the orientation angles between layers of towpreg can be varied to any degree so as to obtain any laydown from unidirectional (anistropic) to random (isotropic). Further, the bonding can be done in patterns or at random for the same reason.

The multiple layers of towpreg also can be bonded together during a winding step. A filament winder can be coupled with a bonding mechanism such that the multiple towpreg layers are bonded together during windup, resulting in 3-dimensional non-woven fabrics. The winding mandrel also can have complex contours such that 3-dimensional non-woven fabrics or preforms can be created, which have complex contours.

The primary object of this invention is to provide a non-woven flexible multiply towpreg fabric.

Another object of this invention is to provide a non-woven flexible towpreg fabric well-suited for pultrusion, filament winding or conversion into sheet of bulk molding compound feedstock, and for fabricating a variety of preforms and composite structures.

A further object of this invention is the production of commercially feasible non-woven towpreg fabric from a variety of fibers and matrices, including a matrix material provided in the form of inexpensive coarse powders.

Yet another object of this invention is to provide non-woven flexible towpreg fabric containing a sufficient number of filaments to be suitable for the economic production of 2-dimensional and 3-dimensional preforms and composite structures An additional object of this invention is to provide non-woven towpreg fabric with the reinforcing fibers sufficiently wetout that excessive pressure is not required to complete fiber wetout during the consolidation of the composite.

Another object of this invention is to produce non-woven towpreg fabric rapidly in order to minimize substantial curing or resin advancement of the matrix during towpreg manufacture.

Still another object of this invention is to produce a non-woven towpreg fabric that can be processed in a manner similar to tacky thermoset prepreg tape to layup advance composite structures.

A further object of this invention is to produce a non-woven towpreg fabric that can be used to make bonded preforms for resin transfer modeling, such as tubular preforms, which can be made by tube rolling.

These objects and others that will become apparent to one skilled in the art are achieved by the present invention as more fully described by the drawings and the detailed description of the invention below.

DETAILED DESCRIPTION OF THE DRAWINGS

FIG. 3 is a comparison of representations of conventional towpreg (FIG. 3a) and the towpreg used in the present invention (FIG. 3b);

FIG. 4 is a representation of the tow plies used in the present invention after solidification of the matrix forming material on the reinforcing filaments prior to gathering (FIG. 4a) and after gathering (FIG. 4b);

FIG. 5 is a representation of the process of melting the matrix forming material onto the reinforcing filaments of the present invention with lateral constraint (FIG. 5a) and without lateral constraint (FIG. 5b) and a section of the neck of matrix forming material between filaments (FIG. 5c);

FIG. 8 is a representation of the unidirectional non-woven towpreg fabric of the present invention with FIG. 8a showing the overlaying of towpregs from an axial viewpoint and FIG. 8b showing the point bonding of the overlayed towpregs.

FIG. 9 is a representation of the multidirectional towpreg non-woven fabric of the present invention having alternate layers of towpreg oriented in different axial directions, with FIG. 9a showing the overlaying of towpregs and FIG. 9b showing the point bonding of the overlayed towpregs.

DETAILED DESCRIPTION OF THE INVENTION

1. General

Figure 5A:
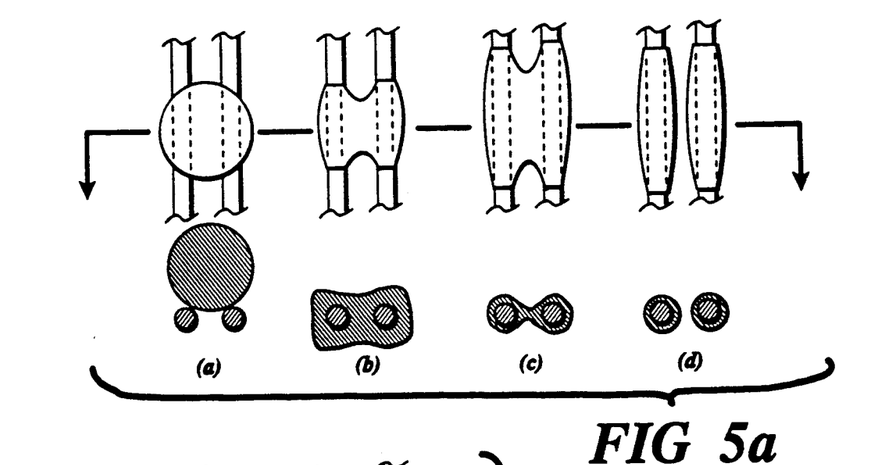
Figure 5B:
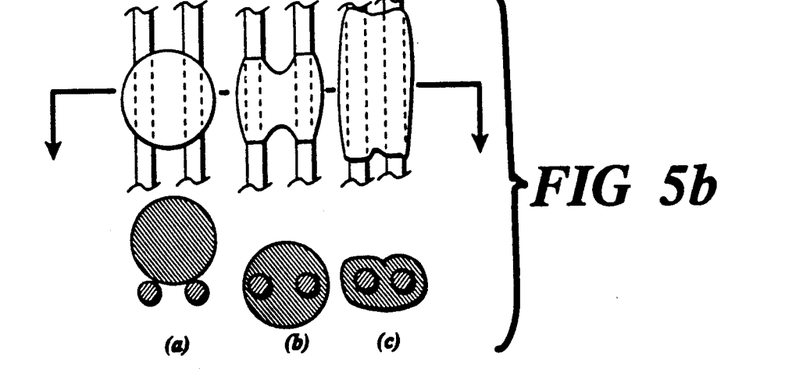

An important feature of this invention is the promotion of fiber or filament wetting or wet-out, while minimizing the coalescence between wetted neighboring filaments. To prevent coalescence between coated filaments, it is necessary to keep the filaments separated until the matrix solidifies. One approach to keep the filaments separated is by restraining the lateral contraction of the filaments by maintaining an axial tension on the filaments. FIG. 5 illustrates the melting of a powder particle supported by two filaments. In FIG. 5a, a high axial tension constrains the filaments from approaching each other. In FIG. 5b, the axial tension on the filaments is low; hence, the filaments can approach each other laterally as the particle melts and wicks along the filaments.

In FIG. 5b-(c), the thickness of the melt between the two filaments is large even after the filaments are substantially wetted. By comparison, in FIG. 5a-(c) the thickness of the melt between the two filaments is substantially thinner than in FIG. 5b-(c) due to constraining the lateral movement of the filaments. Consequently, it is easy to separate the two coated filaments by fracturing the thin film between the two filaments. The result of this separation process is shown in FIG. 5a-(d).

Figure 5C:
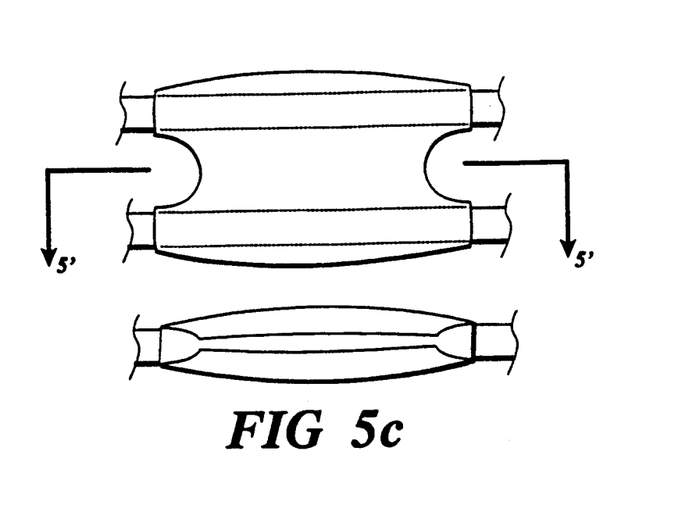

Due to constraining the filaments, a tensile stress develops normal to the filament axis in the necked down melt between the filaments. This condition is illustrated in FIG. 5c. This tensile stress develops because material is drawn away from this interfilamentary area in order to spread along the filaments. The neck will fracture if this state of stress, $\sigma_N$, exceeds the failure stress, $\sigma_f$, for the melt. The failure stress of the matrix can be used as a guide to determine suitable operating conditions for a particular matrix. For example, it is well known that low molecular weight molten materials have virtually negligible tensile failure stresses. It is also known that high molecular weight molten polymers lose strength as their operating temperature is increased. Similarly, partially solvated or plasticized polymers have lower tensile strength than neat polymer.

The thinness of the spread towpreg makes it possible to melt the polymer in a very short time period, and the polymer can be raised well above the normal safe temperature for the melt. In this manner, an extremely low elastic strength in the melt can be achieved to facilitate splitting the towpreg into multiple plies. Conventional matrix forming material systems may operate at a temperature at or slightly above the melting temperature of the particular matrix-forming material. The coating system of the present invention can operate at a temperature significantly higher than the softening temperature of the particular matrix forming material, and generally can operate at a temperature as high as the particular matrix forming material will withstand without incurring degrading reaction or resin advancement during the residence time within the system. The residence times used in this invention can be short enough such that no matrix forming material degradation or resin advancement is apparent. The temperature at which the oven operates is related to the residence time of the substrate/matrix material in the oven—higher temperatures can be used if residence time is reduced, and vice versa. In this manner, temperatures higher than the temperature at which the matrix material incurs degrading reaction or resin advancement occurs can be used, so long as the residence time is sufficiently short such that the matrix material does not remain at such a temperature for a length of time sufficient to allow the matrix material to incur degrading reaction or resin advancement.

The same conditions that lead to lower tensile strength in a viscoelastic liquid lead to lower surface tension and lower viscosity for the liquid. Thus, the same conditions that promote filament separation also promote spreading of the liquid along the filaments. Thus, the conversion in liquid shape depicted in FIG. 5a can be physically realized by manipulating material and operating conditions such that the elasticity of the liquid is minimized. By constraining or preventing the lateral contraction of the filaments towards each other, the length of the neck before fracture, $L_n$, can be minimized. Then thinning of the cross-sectional area, $A_n$, is promoted and the force, $F_n$, required for fracture is reduced. Thus, maintaining a high degree of tow spreading throughout wetting and solidification promotes separate filament coating. Fracture of the liquid film between filaments can be facilitated by additional forces. Hot gases blown normal to the plane of the spread tow will promote interfilament film fracture. Running the spread tow over grooved rolls, such that the filaments are forced towards the roller axis, will facilitate splitting interfilamentary films. A variety of mechanical devices can be introduced to assist filament separation like the grooved rolls.

In order to produce the towpreg of this invention, substantial wetout of the fibers by the matrix material must be accomplished such that the matrix-forming material has been liquefied sufficiently to achieve adhesion to the filaments without the use of a conventional adhesive or binder. Wetout is accomplished typically via a matrix material liquefier, such as a melter or oven, which, through heat, puts the matrix material into a liquid state. There are various liquefiers available, including any of the radiation or conduction ovens. Radiation ovens are preferred for dry powder. Additionally, a hot die can be used in place of an oven.

As the matrix material is liquefied as part of this invention, it is possible to use any size particles of matrix material powder to coat the filaments, including coarse particles. The liquefaction of the matrix material and the wicking of the matrix material along the filaments reduces the problem of coarse blending between matrix material and filament associated with applying large diameter particles to small diameter filaments. Therefore, the particle size of the matrix forming material in this invention is not critical and can range from the diameter or thickness of the filaments or smaller, which is the generally accepted size in the art for coating, to a diameter or thickness many times larger than that of the filaments, as in the present invention. The use of large diameter or thickness particles of matrix forming material which, until the process of the present invention had not been used with any success, also results in significant cost savings.

A single towpreg contains several plies that vary in thickness and width. The average thickness of the ply is less than 100 microns and is preferably less than 50 microns. The maximum thickness of the ply is about 100 microns and the minimum height of the ply is the diameter or thickness of an unimpregnated fiber used as the reinforcing filament in the ply. Typically, the length of a ply is greater than the width of a ply and both the length and width of a ply are greater than the thickness of a ply. Generally the thickness of a ply is much less than the width of a ply, which is generally less than 2000 microns. Additionally, the average length of a ply is preferably greater than 30 times the thickness of a ply.

2. Preferred Materials

The various fibers that are useful as the tow fibers or filaments include glass fibers; carbon and graphite fibers; organic fibers, particularly liquid crystal fibers, such as aramids and aromatic polyesters, which are not low melting; ceramic fibers, such as silicon carbide; and hybrid fibers, such as aramid/carbon, aramid/glass, aramid/carbon/glass, and carbon/glass fibers.

In general, fibers with a diameter or thickness greater that 25 microns are not useful. For example, there is no point in using a boron fiber with a diameter of 140 microns, as fibers of that thickness cannot be made very flexible. Furthermore, the fiber chosen should be a reinforcing type fiber and should be available in continuous form. Suitable fibers should be thermally stable at the temperatures involved in the matrix consolidation step. Additionally, suitable fibers must have glass transition and melting temperatures greater than room temperature and melting temperatures greater than the consolidation temperature of the composite.

Both thermoplastic and thermoset polymers are suitable for use as matrix materials. Preferred polymers generally should not be tacky and should have a glass transition or melting temperature greater than room temperature while in service and after curing. Preferably, the glass transition temperature should be greater than room temperature. Therefore, elastomers, rubbers, and leathers, which are not rigid at room temperature, are unsuitable for use as the matrix material. Thermosets, which can be tacky at process temperatures, can be processed cold to reduce tackiness and increase suitability as matrix materials. Non-polymer materials, such as copper and low melting point metals, also may be used as the matrix materials. The matrix material can be of any configuration, such as particles, powders, and short length fibers.

Example classes of polymers are the ABS group, acetals, acrylics, alkyd polyesters, allyls, aminos, epoxies, fluoroplastics, furans, melamines, nylons, phenolics, phenylene oxides and ethers, polyamides, polyamide-imides, polybutylenes, polycarbonates, polyesters, polyetheretherketones (PEEK), polyetherketones (PEK), polyetherketoneketones (PEKK), polyetherimides, polyethylenes, polyimides, polymethylpentenes, polyphenylene sulfides, polypropylenes, polystyrenes, polyurethanes, sulfones, ureas, and vinyls. Copolymers, alloys, and blends can be suitable polymer matrices.

Within these classes of polymers, specific grades that are not tacky immediately following solidification after the creation of a multiply towpreg are preferred. In addition, thermosetting polymers should not be fully cured when the towpreg is initially solidified in order to permit bonding between the plies and tows when the composite part is finally cured. The preferred polymers for use as the matrix material include engineering polymers, such as polyetheretherketones, polyamides, epoxies, and polyesters.

3. Production Example

To achieve substantial wetout, sufficient residence time is required, in the apparatus selected, to put the matrix in a liquid state and to allow the matrix material to sufficiently wetout the fiber. It is important that during the wetout stage the fibers or filaments are not allowed to collapse laterally. This is prevented by maintaining sufficient tension on the tow.

Figure 2:
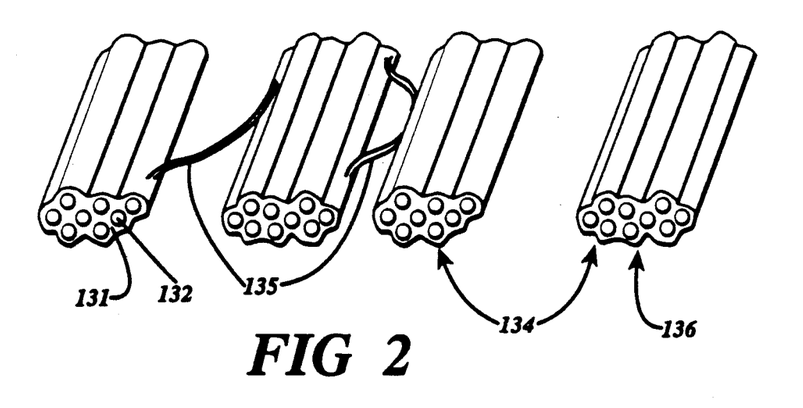
FIG. 2 is a representation of the flexible tow plies used to produce the non-woven towpreg fabric of the present invention.

After the fibers or filaments have been substantially wetout, the liquefied matrix material generally coats an entire bundle of fibers or filaments. In order to produce the towpreg of this invention, the fibers must be split from each other as shown in FIG. 2 so as to produce individually coated multiple plies within a tow. With reference to FIG. 2, the individually coated multiple plies, represented generally as 134, are composed of reinforcing filaments 132 and matrix forming material 131. Although entirely individual plies 134, such as represented generally by 136, are ideal, the plies 134 can be connected to each other by interply connectors 135, which generally are single filaments 132 coated with matrix forming material 131. These coated plies have a lower flexural rigidity than fully consolidated towpreg.

Figure 3A:
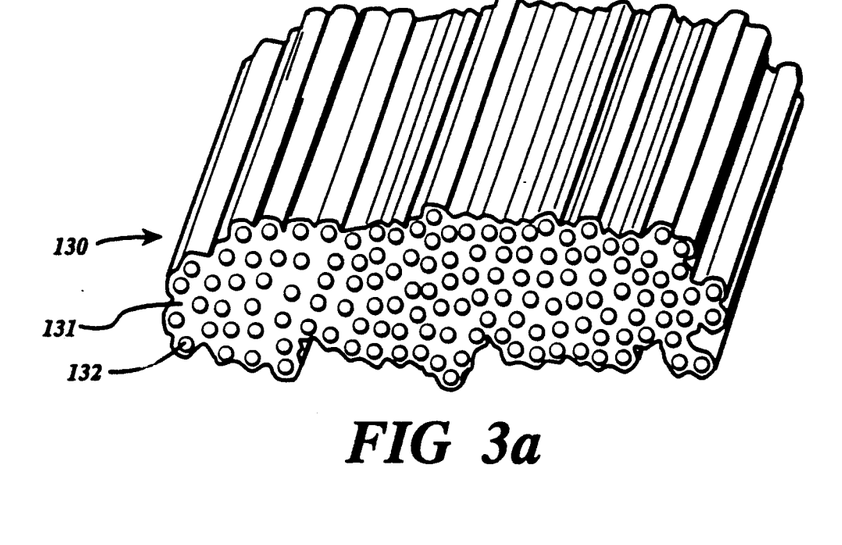
Figure 3B:
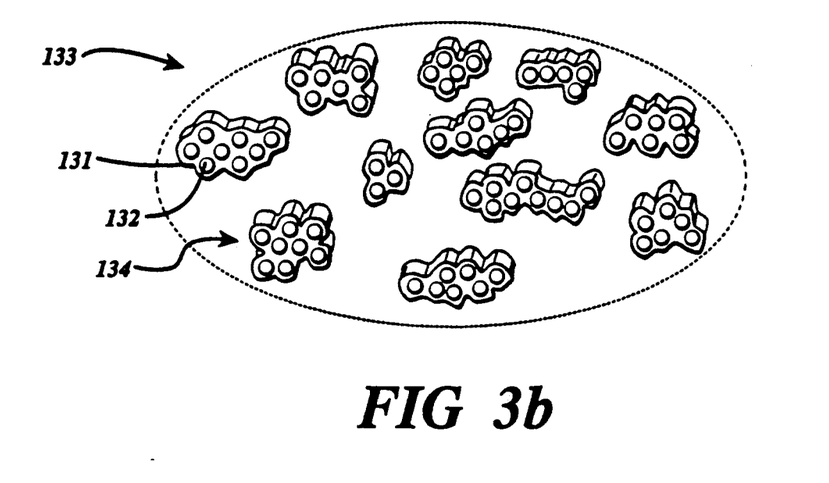
Figure 4A:
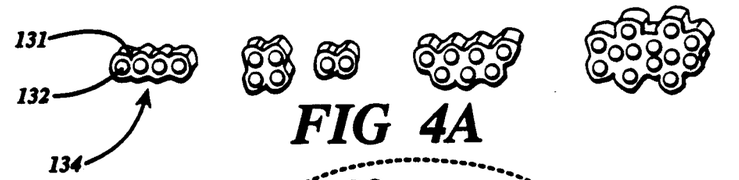
Figure 4B:
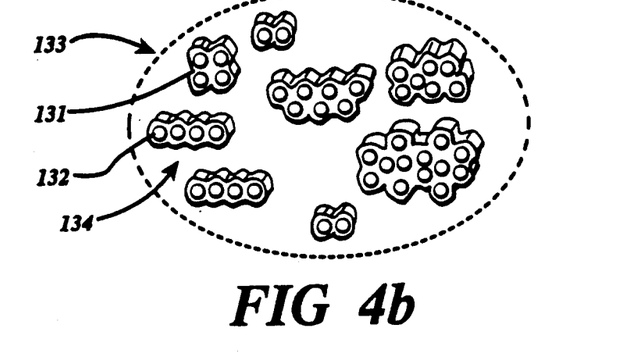

With reference now to FIGS. 3 and 4, in conventional towpreg production, tows containing bundles of generally about 800 to 13,000 filaments 132, each filament 132 having a diameter or thickness of generally about 4 to 13 microns, are converted to towpregs 130 by coating with matrix forming material 131. The conventional process yields a towpreg "ply" 134 of about $\frac{1}{8}$ to $\frac{1}{2}$ inch wide. The term "ply", as used in the conventional process, indicates an individual, conventional single-ply towpreg 130 that can be used alone or with other conventional single-ply towpregs 130 to form composite structures. The "plies" 134 of the present invention are individual, substantially wetout bundles of filaments 132, each bundle or "ply" having an average thickness of 100 microns or less and preferably less than 50 microns, which are gathered to form a "multiply" towpreg 133 of any desired thickness.

Splitting occurs if the fibers or filaments are well spread by the tow spreader and are held in sufficient tension throughout the process such that the fibers or filaments cannot collapse laterally onto each other. Splitting can occur concurrently with wetout in the oven as it generally occurs as the liquefied matrix material wicks longitudinally along the axis of the fiber or filament. Various alternative methods of splitting can be employed such as the addition of mechanical separators, including grooved rolls, knives, laser cutters, and convection currents perpendicular to the spread tow.

4. Characteristics of Base Towpreg

ASTM D 1388 is a standard test method used to determine the stiffness of fabrics. This standard can be used to characterize the stiffness of the towpreg. Generally, a standard sample is 1 inch wide; however, measurements can be made on tows less than 1 inch wide, as long as the results are corrected for this difference. ASTM D 1388 is incorporated herein by reference.

A standard thermoplastic prepreg, such as APC 2 made by ICI, is 5 mils or 127 microns thick and has a flexural rigidity estimated to be 216,000 mg-cm. A towpreg with this flexural rigidity is more difficult to form into a flexible non-woven fabric and, thus, a thinner towpreg is preferred; that is, a multiply towpreg with an average ply thickness less than about 50 microns. Such towpregs are produced by this invention.

Flexibility is important for forming non-woven fabrics from towpreg. The cantilever test method, ASTM D 1388-64 (1975), is used to calculate the flexural rigidity by measuring the bending length of the towpreg. Bending length is a measure of the interaction between the weight of the towpreg and its stiffness as indicated by the way in which a towpreg bends under its own weight. It reflects the stiffness of the towpreg when bent in one plane under the force of gravity, and is one component of drape.

The maximum elastic strain in the towpreg is at its surface. Reinforcing fibers typically cannot withstand compressive strains beyond 0.3% without buckling. For an elastic ply, this strain can be related to the ply thickness and minimum bending radius through the following expression:

$$h = 2R_{min}e$$

where:
h = the ply thickness
$R_{min}$ = ply bending radius
e = maximum allowable surface strain.

Figure 6:
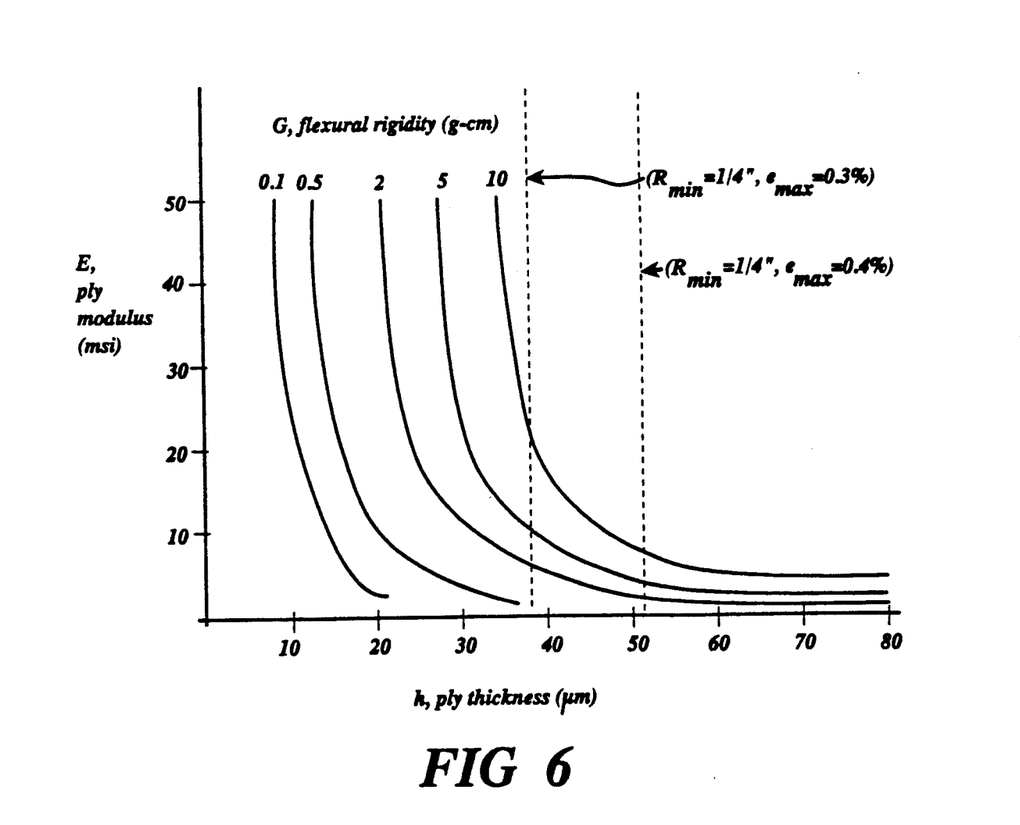
FIG. 6 is a graph of tow ply thickness versus tow ply modulus of elasticity of varying flexural rigidities for certain of the tow plies used in the present invention.

For example, a ply subjected to a minimum bending radius of 10 mm and a maximum allowable strain of 0.3% cannot be more than 60 microns thick. The minimum bending radius depends on the part geometry and the maximum strain depends on the reinforcing fiber. Thus, ply thickness depends on both the material and application. This is shown graphically in FIG. 6.

Although the towpreg of this invention is defined by its physical characteristics and, subject to these characteristics, can be composed of any combination of the tow filaments and matrix materials listed above, the following examples will help to illustrate several example towpregs suitable for forming the flexible non-woven fabric of this invention.

5. Sample Towpregs Suitable For Forming Non-Woven Fabrics a. Carbon fiber tow filaments/PEEK matrix material.

Unsized 6K Hercules AS4 carbon fiber tow, each carbon fiber filament having a diameter of 8 microns, passes through an air banding jet that spreads the tow to about 60 mm wide. Rollers before and after the spreader create tension in the tow. The tow passes over an electrostatically charged bed containing PEEK 150 PF powder from ICI with an average particle size of 90 microns. The tow is grounded and the powder is charged at about −65 kV. The tow passes in spread condition under lateral tension, to prevent collapse, through a tubular oven set at 450° C. to melt the PEEK. The tow is cooled in air and passed through drive rollers to a tension controlled winder. The residence times in the powder coater and the oven are 1.4 and 6.7 seconds, respectively. The line speed is 6.8 meters per minute, the fiber content of the towpreg is 60% by volume. The towpreg flexural rigidity is 890 mg-cm compared to 670 mg-cm for the uncoated tow. By comparison, consolidated towpreg has an estimated stiffness of 216,000 mg-cm.

b. Glass tow filaments/PEEK matrix material.

A towpreg comprised of Owens Corning Fiberglas high temperature sized S2 glass with 4,080 filaments, each glass filament having a diameter of 9 microns, impregnated with PEEK matrix material is produced as in Example I. After the glass filament tow passes through the air banding jet and the rollers before and after the air banding jet, the tow is wiped by a wet sponge to improve surface conductivity. Then the tow passes over the electrostatically charged bed containing the PEEK 150 PF powder from ICI with an average particle size of 90 microns. The tow is grounded and the powder charged at about −70 kV. The tow passes, in a spread condition under lateral tension to prevent collapse, through the tubular oven set at 450° C. to melt the PEEK. The tow is cooled in air and passed through drive rollers to a tension controlled winder. The residence times in the powder coater and oven are 5.2 and 26.3 seconds, respectively. The line speed is 1.7 meters per minute. The fiber content of the towpreg is 60% by volume.

c. Carbon fiber tow/LaRC-TPI matrix material.

A towpreg comprised of unsized 6K Hercules AS4 carbon fiber tow, each carbon fiber filament having a diameter of 8 microns, impregnated with LaRC TPI, a thermoplastic polyimide, is produced as in Example I. After the carbon fiber filament tow passes through the air banding jet and the rollers before and after the air banding jet, the tow passes over the electrostatically charged bed containing the LaRC-TPI powder from Rogers Corp. with an average particle size of 35 microns. The tow is grounded and the powder charged at about −67 kV. The tow passes in spread condition under lateral tension, to prevent collapse, through the tubular oven set at 400° C. to melt the TPI. The tow is cooled in air and then passes through drive rollers to a tension controlled winder. The residence times in the powder coater and oven are 3.2 and 16 seconds, respectively. The line speed is 2.9 meters per minute. The fiber content of the towpreg is 37% by volume. The towpreg flexural rigidity is 7,000 mg-cm compared to 670 mg-cm for the uncoated tow.

6. Method of Production

Figure 1:
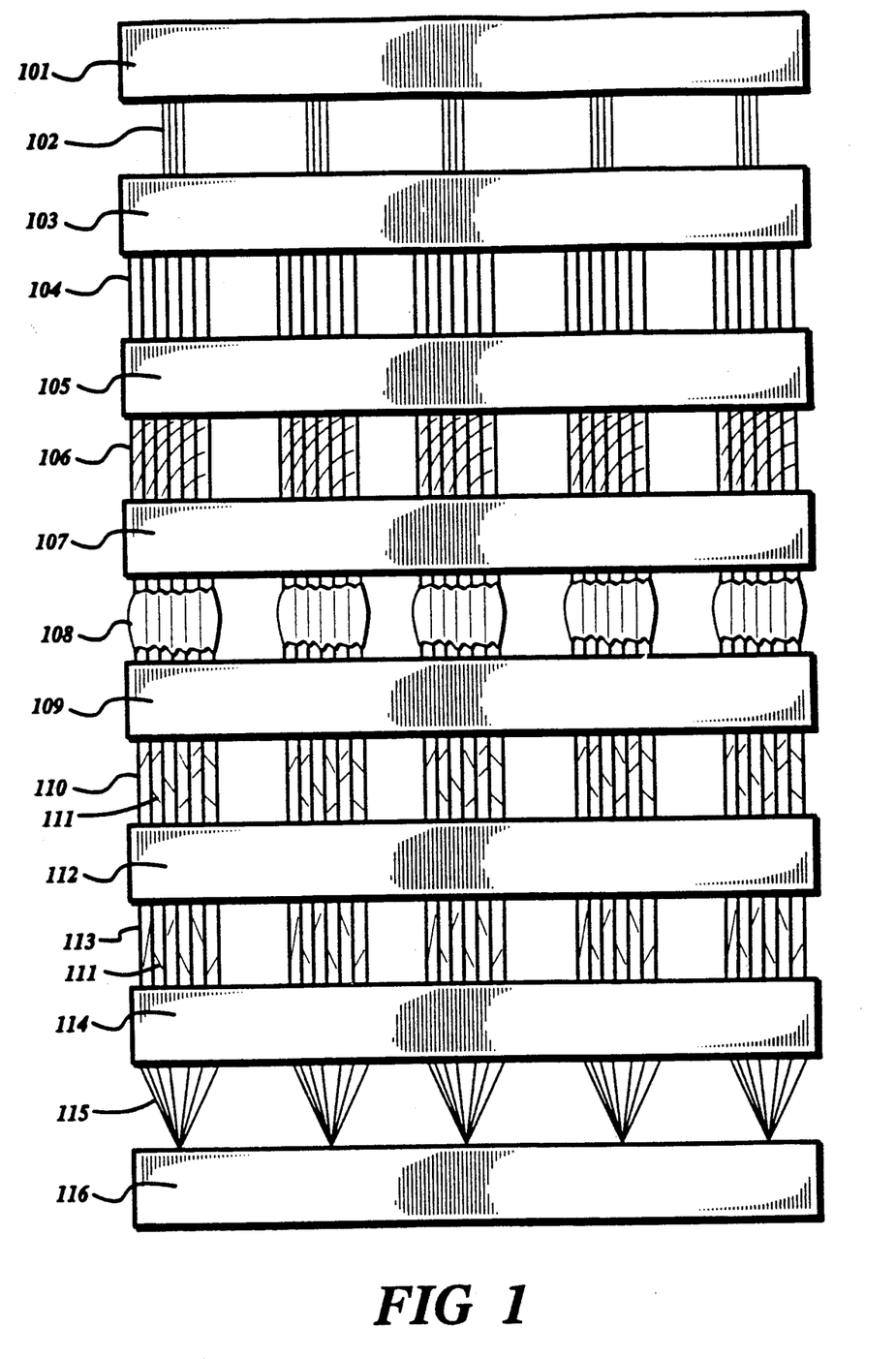
FIG. 1 is an overall flow diagram of the process of the present invention.

The method for producing the base towpreg of this invention is shown in a simplified flow process chart in FIG. 1. The tow 102 is supplied during the let-off step 101, which can be bobbins or spools of tow, tow from an upstream process, or from any other tow supply. The tow 102 consists of many individual filaments 104, which are spread or separated from each other, so as to form a lateral spread of individual filaments 104, in the spreading step 103. The now spread filaments 104 are coated with matrix forming material during the coating step 105. After the filaments 104 are sufficiently coated 106 with matrix forming material, the matrix forming material is liquefied in wetout step 107, forming sufficiently wetout tow 108.

As the liquefied matrix forming material wicks down the filaments 104, the thickness of the matrix forming material becomes thinner until the thin film fractures between filaments 104 (see FIG. 5) either before or during the splitting step 109. If the tow 108 is sufficiently spread and the spread is maintained, a splitting step 109 is not necessary, as the film will fracture between filaments 104 as the film solidifies. The now coated filaments 110, either individually or in bundles, are cooled in the cooling step 112 where the matrix forming material solidifies. During the cooling step 112, groups of filaments 110 form individual tow plies 113. Sometimes individual filaments 110 link neighboring tow plies 113 as interply connectors 111 during the cooling step 112. The tow plies 113 are pulled by a pulling means 114 so as to keep the tow 102 moving and to place axial tension on the filaments 104 so the individual filaments 104 do not collapse upon themselves, thus forming a mass of filaments and matrix material.

With reference now to FIGS. 8–11, the plies 113, interply connectors 111, and individual filaments 110 together makeup an individual towpreg 133 comprising reinforcing filaments 132 coated with matrix forming material 131. After the towpregs 133 are cooled in the cooling step 112, the towpregs 133 are arranged in a desired fabric pattern, such as the unidirectional overlap pattern shown in FIG. 8a or the multidirectional overlap pattern shown in FIG. 9a. Preferably, the arrangement of towpregs 133 comprise the overlapping of the towpregs 133 so as to increase the strength of the resulting fabric 139.

Figure 11:
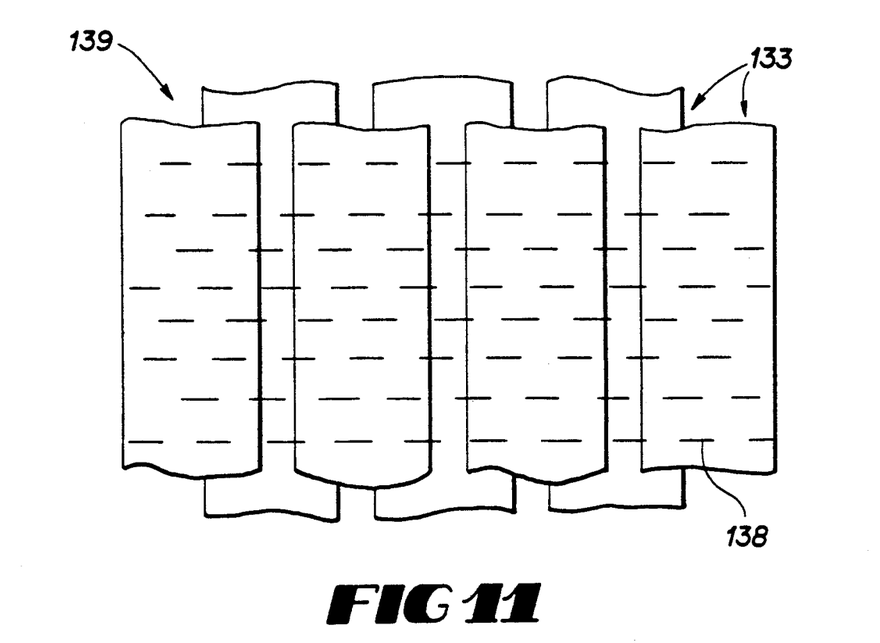
FIG. 11 is a top view of the unidirectional non-woven fabric shown in FIG. 8a indicating a typical stitching pattern.
Figure 12:
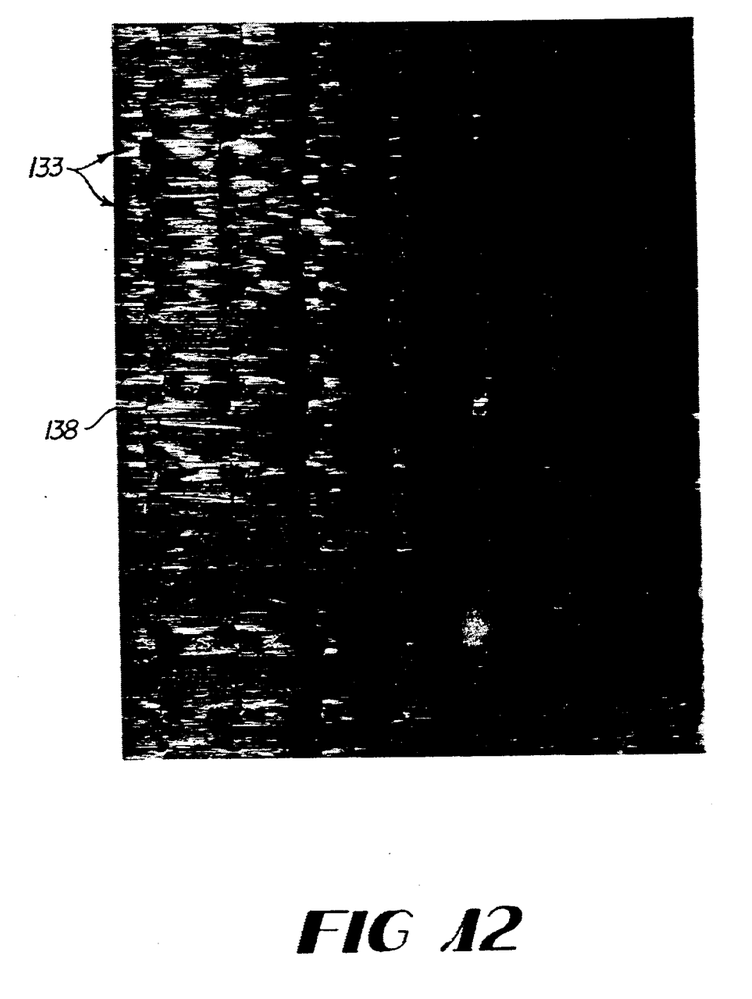
FIG. 12 is a photograph of a non-woven fabric according to this invention made by interleaving a binder filament.

Once the towpregs 133 are properly arranged, the towpregs 133 are bonded together. Hot melt bonding of the overlayed towpregs 133 at selected points results in the point bonded fabric 139 shown in FIG. 8b and FIG. 9b. One or more point bonds 137 are used to bind the towpregs 133 together. Using point bonding rather than continuous bonding of towpregs 133 to each other results in a fabric 139 which maintains flexibility. Alternatively, stitching 138, needle punching, pressure point bonding, or water-jet impingement can be used to bind the towpregs 133. A representation of such a stitch pattern is shown in FIG. 11. The stitching can be done at an angle to the direction of travel of the towpregs 133 to facilitate continuous processing. The non-woven fabrics of this invention do not have interleaved reinforcing fibers; however, binder filaments or yarns may interleave the reinforcing fibers as shown in FIG. 12. In this case, the hybrid fabric is woven, but the assembly of reinforcing fibers is non-woven.

The resulting fabric 139 then can be wound in a winding step for further use. Alternatively, the towpregs 133 or the resulting fabric 139 can be acted upon so as to create 2- and 3-dimensional non-woven fabrics and even preforms having complex contours. For example, tubular preforms can be made by multiaxial layup or tube rolling, a common practice for fabricating golf club shafts, tennis rackets, and sailing masts, among other structures.

7. Preferred Apparatus for Producing Non-Woven Towpreg Fabric

It should be noted that the above steps define the method of this invention and are not to be limited to the specific examples given throughout this specification. However, to better understand the above steps, the example below is provided with reference to the specific apparatus 8 shown in FIG. 7.

Figure 7:
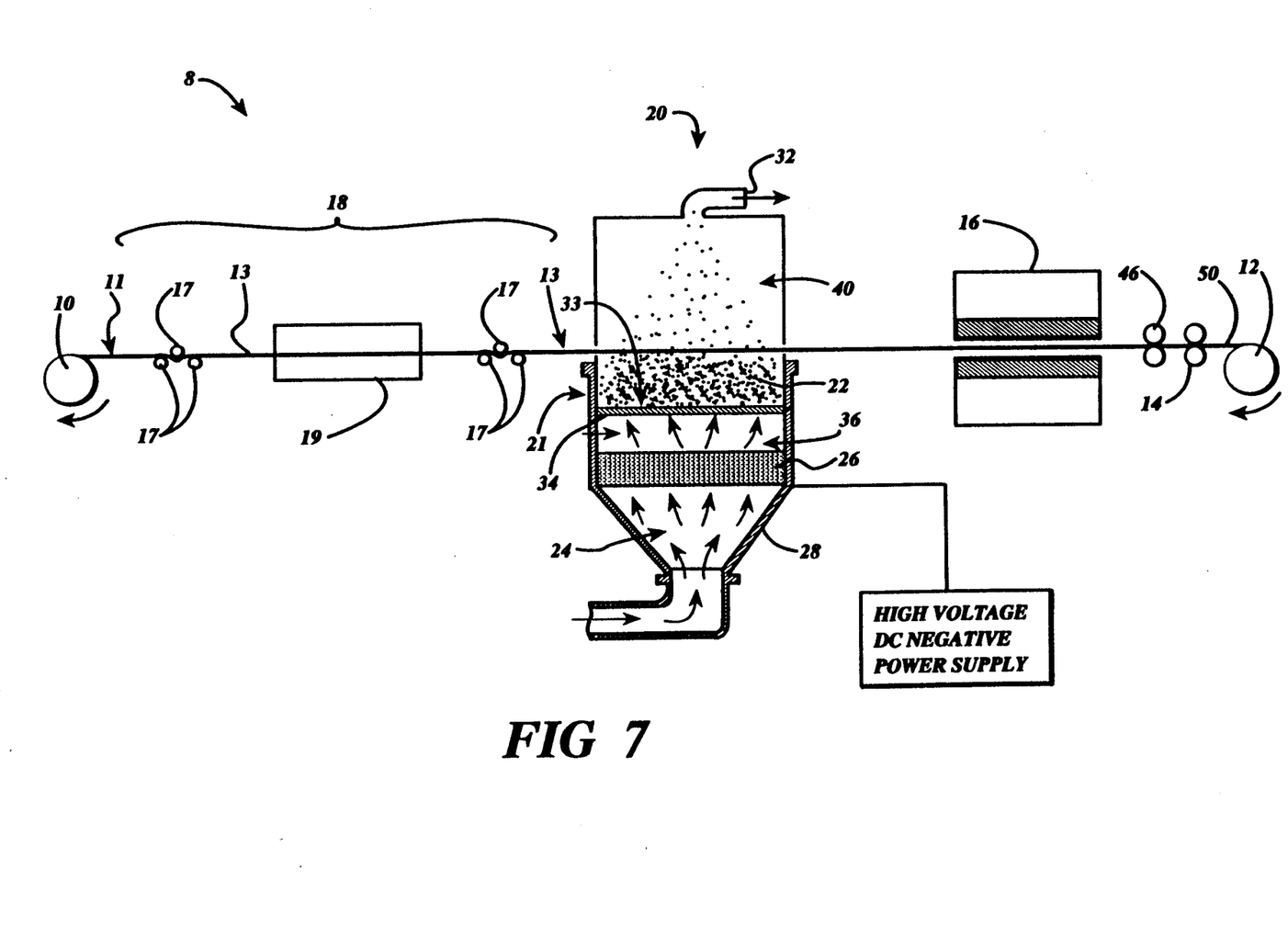
FIG. 7 is an overall schematic of the process of the present invention using an electrostatic fluidized bed as the coating system.
Figure 8A:
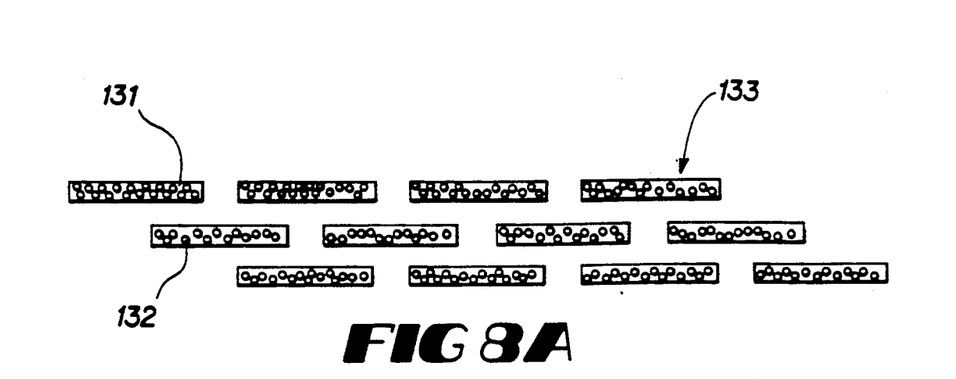
Figure 8B:
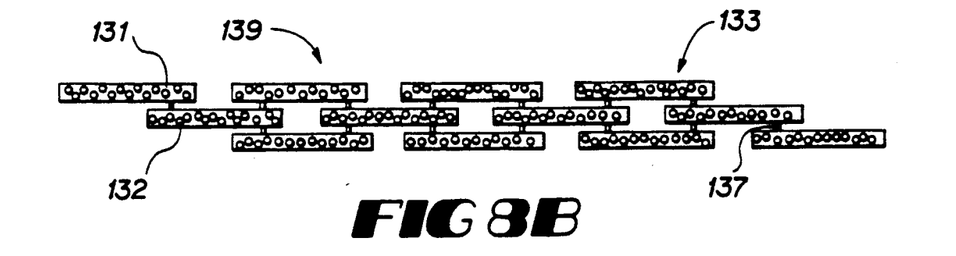
Figure 9A:
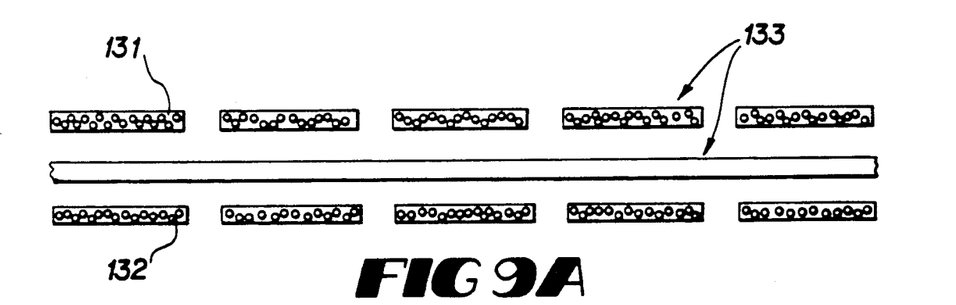
Figure 9B:
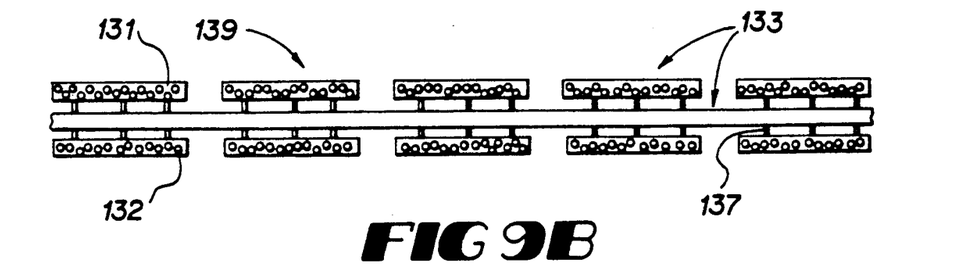

The tow 11 supplied on let-off wheel 10 is drawn through the apparatus 8 and secured to take-up wheel 12. The take-up wheel 12 is rotated at a variable speed and the let-off wheel 10 is not necessarily driven. Typical linespeeds are 10 to 100 feet per minute. Slower speeds are feasible but are not economically attractive for a number of reasons including, for example, less towpreg produced per time unit and the chance that the matrix forming material will be destroyed through degradation or resin advancement due to increased oven residence time. Higher speeds can be achieved provided towpreg supports are installed to minimize tow vibration, the matrix applicator is long enough to ensure sufficient matrix is applied, and the oven is long and hot enough to liquefy the matrix. Line speeds above 100 feet per minute are feasible in some cases under proper conditions. Intermediate pinch rollers 14 are used to pull the fibers as they come out of the oven 16. A constant tension winding on take-up wheel 12 is maintained by adjusting the winder motor (not shown) speed with a tension controller (not shown). The fiber speed through the apparatus 8 can be controlled by adjusting the speed of the pinch rollers 14.

The tow let-off in this example is taken directly from bobbins of wound tow. The tow also can come directly from upstream processes. During let-off, it is important to avoid twisting the filaments 13 making up the tow 11 as twisted filaments 13 are more difficult to separate. Additionally, it is helpful to control the tension on each individual bobbin of tow to keep the line tension constant throughout the impregnation process. A tow guide plate (not shown) may be placed between the let-off mechanism and the tow spreader to aid in guiding the tow through the tow spreader.

The tow spreader 18 in this example uses a series of 6 rollers 17, although the number of rollers is not critical, and an air comb 19 to spread the fiber tow 11 to individual filaments 13. The rollers 17 are arranged in two groups of three rollers each; one group located just before the air comb 19 and one group located just after the air comb 19. The two main purposes of the rollers 17 are: (1) to provide tension to the tow thus reducing the amount of lateral collapse of the tow onto itself during the process; and (2) to reduce the vibration of the tow. The rollers 17 can be made of any material and have any surface characteristics; however, smooth Teflon rollers are preferred as they provide for good spreading of the tow. At least one of the rollers 17, preferably the one immediately before the coating system 20, must be made of a conducting material, stainless steel being preferred, so as to ground the tow 11 before it enters the coating system 20. The air comb 19 is already known in the art.

The tow 11, after leaving the let-off wheel 10, enters the first group of rollers 17 where the filaments 13 are spread. The configuration of this first group of rollers 17 allows the tow to weave through the first group of three rollers 17, passing over the first roller, under the second roller and over the third roller, helping to impart a constant tension on and to reduce the vibration of the tow filaments 13. The tow 11 then enters the air comb 19 where forced air further spreads the filaments 13. After leaving the air comb 19, the tow 11 enters the second group of rollers 17 where the filaments 13 are further spread. For example, a 3000 filament tow typically is spread more than one inch wide in order to obtain a flexible towpreg. The configuration of this second group of rollers 17 is similar to the configuration of the first group of rollers 17 for the same reasons. As mentioned previously, it is preferred that the final roller in this second group of rollers be made of a conducting material so as to ground the tow prior to entering the coating system 20.

Various other tow spreader 18 methods are available, including smooth, grooved or crowned rollers or drums; air combs; a combination of air combs and rollers or drums; air banding jets; ultrasonic spreaders; and liquid baths. Of prime concern in choosing a tow spreading method is that the method chosen will spread the tow into a columnated tape, preferably only one filament thick, and that the method will not damage the tow fibers or filaments.

Additional subprocesses may be included between the tow spreader 18 and the coating bed system 20 as required in the various applications. For example, equipment for desizing, surface activation, and application of adhesion promoters may be desired to produce a towpreg desired for a specific application.

The tow filaments 13 next enter a coating system 20 where the matrix material is applied to the tow filaments 13. As the filaments enter and pass through the coating system 20, the spread of the filaments 13 is maintained. Many different coating systems 20 are useful and are discussed as examples below. Electrostatic fluidized bed systems, wet powder, hot melt, solution, and powder spray coating are suitable.

a. Fluidized Bed

The fluidized bed coating system 20, in its simplest embodiment, comprises an enclosure 21 within which the matrix material powder 22 is confined. By a combination of air flow 24 and mechanical vibration, the powder 22 is fluidized and simultaneously electrically charged by means of high voltage electrodes 26 situated at or near the base of the container 28. The electrode 26 may consist of sharp points or, more usually, small diameter wires. At the top of the coater enclosure 21 there is an open port 32 to allow the escape of the fluidizing air 24.

Passing the tow 11 over and under rollers connected to a metal frame is one procedure to simultaneously ground and spread the fibers. With greater spreading, more powder can be picked up and greater flexibility of product results because the towpreg is thinner. When the fiber tow is not spread prior to coating, the towpreg emerges in a round brittle state and the fibers within the tow are not totally coated.

The powder particles 22 are uniformly dispersed in the container 28. A preferred particle size range is from about 20 to about 80 microns, with an average particle size of about 50 microns. Flexible towpreg suitable for braiding purposes has been produced from both finer and coarser particles. Particles less than about 20 microns have been applied successfully, although it is likely that these fine powders, especially those less than about 10 microns, agglomerate into larger particles in the fluidized bed. Coarse particles up to about 250 microns have been applied, but the flexibility of the towpreg is reduced as the size of the applied powder is increased. The coarseness of the particles must be counterbalanced by the flexibility desired in the towpreg for downstream processing. Porous plate 34 provides for a very high resistance to travel of air 24 through the plate 34 while permitting passage of sufficient air 24 at low velocity to fluidize the powder 22. The mechanical vibration of the porous plate 34 is used to enhance fluidization and to reduce the possibility of air channeling and powder clumps. The depth of powder material 22 in the bed 33 is usually two to four inches (50 to 100 mm).

In the fluidized bed system 20, individual particles of the powder 22 adhere electrostatically to the fibers. The charged particles of powder 22 repel each other to such a degree that they rise above the chamber container 21 forming a cloud 40 of charged particles, through which the fibers are passed. In this example, a model C30 electrostatic fluidized bed coater from Electrostatic Technology Incorporated is used. The bed dimensions are 6×6 inches. The electrical output is 0–90 kV and the air input is 0–12.5 standard cubic feet per minute (SCFM).

The fluidized bed system 20 also incorporates an ionized air system 36 created by charging electrodes 26 below the fluidized bed 33 to prevent the unintentional ignition of the fluidized powder 22 by electrical sparking.

The fluidizing air 24 used in conjunction with this process must be dry and clean because contaminants within the air supply would result in blocking the porous plate 34 and uneven fluidization. Moisture in the air causes the powder 22 to pack on the fluidized bed 33, causing reduced fluidization efficiency. Normally dry air 24 at a pressure of 30 to 80 psi supplied at a rate of approximately 5 cu.ft./min per square foot of diffuser plate 34 is appropriate. The fluidized powder 22 is maintained in the fluidized state by controlling the air flow 24. A typical method for drying the fluidizing air 24 is to use a cylindrical chamber (not shown) filled with silica gel, such as Drierite, which can absorb 10–14% of its weight in $H_2O$ when drying gases. Wet air enters the dryer and moves through a mesh screen into the silica gel. Moisture is separated out in the chamber. Dry air 24 then flows through the outlet to the fluidized bed 33.

The voltages employed in the fluidized bed system 20 are usually from between about $-30$ to about $-100$ kV. In most cases, negative polarity is used. The output voltage should be approximately $-100$ kV maximum and the maximum output energy when the system 20 is shorted to ground must not be greater than the ignition energy of the particular materials 22 being applied. The high voltage required depends on the powder being used and generally ranges from about $-35$ to about $-90$ kV. For example, polyester powders achieve a better coating when charged at $-40$ kV or less; epoxy powders perform well in the range from $-40$ to $-70$ kV; vinyl powders generally require a higher charge, on the order of $-60$ to $-75$ kV, and for PEEK, good powder pickup occurred at $-70$ to $-90$ kV.

A vacuum exhaust system (not shown) is positioned to collect and return the excess coating powder to the powder supply reservoir (not shown). A typical exhaust system consists of one or more cyclones or bag filters (not shown), or a combination of both. Top exhaust, entrance and exit port exhaust, or perimeter exhaust are all techniques that can be applied. The velocity of exhaust air should be about the same as the velocity of the inlet air flow 24. In this example, the exhaust system employs a cartridge type exhaust to recover powder by collecting the powder in a vacuum bag filter. Powder is drawn to the cartridge by air suction, and then recovered by shaking the pocket or the bag filter inside the cartridge.

Typical residence times in the powder coating chamber are from about 1 to about 5 seconds. This time depends on the type of fiber, the extent of the fiber spreading, the matrix material, the particle size, the coater operating conditions (e.g., the air flow and electrostatic charge), and the amount of matrix sought in the towpreg.

The coated fiber next enters the oven 16. This should be accomplished as soon as it leaves the fluidized bed system 20 in order to melt the powder 22 onto the fibers before the decay of charge or charge relaxation occurs and the powder falls off the fibers. The oven 16 temperature depends on the fiber and the powder 22. However, oven 16 temperature preferably should be kept below the decomposition temperature of the powder 22 resin to avoid degradation. The oven temperature should be sufficiently high to melt the matrix forming material. To reduce the oven residence time and enhance wetout, higher oven temperatures can be used; however, the temperature and residence time within the oven 16 or heater 70 should be set to insure that the decomposition temperature of the powder 22 resin is not achieved for the residence time the coated fibers are in the oven 16 or heater 70. The coated tow can be heated by either convection or radiant heating. In this example, the oven 16 is a Lindberg single zone tube furnace. It has a maximum operating temperature of 1200° C., is 30 inches in length, and has an inside diameter of 2 inches. Typical residence times in the oven for the towpreg are about 2 to about 20 seconds. In most cases, a residence time of less than about 10 seconds is adequate for liquefying and fusing the matrix material to the fibers. For viscous melts, like high molecular weight polyethylene, longer times may be required to promote wicking along the fibers.

b. Wet Powder Coating

In wet powder coating, the matrix material is a wetted powder, such as a slurry or emulsion coating. In wet powder coating, there is no need to ground the fiber tow prior to entering the coating system; therefore, the stainless steel roller mentioned above is not necessary. After leaving the tow spreader, the filaments are drawn through an optional primer for applying an adhesion promoter.

After leaving the primer, the filaments travel into the wet powder coating system proper, which comprises a roll coater, a wet powder or emulsion reservoir, and a slurry pump. The matrix material powder is suspended in a liquid medium that can be either water or solvent based. The water based medium includes water and, possibly, a water soluble binder, and the solvent based medium contains a solvent and a dissolved binder. The filaments travel over the top surface of the roll coater that rotates generally in a direction complimentary to the direction of filament travel. The lower surface of the roll coater contacts the slurry or emulsion in the reservoir and becomes coated with the slurry or emulsion. As the roll coater rotates, it brings the slurry emulsion to its top surface where it contacts and coats the traveling filaments. The slurry pump maintains the slurry or emulsion in a uniform concentration.

The coated filament leaves the roll coater area and enters a drier where the water or solvent are evaporated from the slurry coating the filaments. The water soluble binder may be removed provided the resin is fused to the filaments. The now dry filaments leave the drier and enter a melter where the matrix material is liquefied and wets the filaments. An alternative to using a roll coater in the wet powder coating system is to draw the filaments directly through the slurry or emulsion itself. After being drawn through the slurry or emulsion, the filaments then travel directly to the drier.

c. Hot Melt Coating

A hot melt system typically comprises a roll coater or an extruder and die. The hot melt system utilizes the roll coater, operates in the same manner as the wet powder coating system described above, with the exception that the slurry or emulsion reservoir is replaced with a melt reservoir containing the hot melt of the matrix material. As in the wet powder coating system, the roll coater is optional as the filaments can be drawn directly through the hot melt reservoir.

The hot melt coating system utilizing the extruder and die operates by pulling the spread filaments through a slit die supplied with hot melt by an extruder. The matrix material coats the tow filaments in the die. The die land is grooved to facilitate splitting the towpreg into multiple plies. Fiber wetout starts as soon as the hot melt of the matrix forming material contacts the filaments. Therefore, an oven to accomplish further wetting may not be necessary. Special provisions, such as a grooved die or roll coater, may be necessary to facilitate splitting the towpreg into multiple plies.

d. Solution Coating

Solution coating systems utilize various solvents. In this system, the matrix material is dissolved in an applicable solvent and the fiber tow is drawn through this matrix material/solvent solution or over a solution coated roller so as to coat the filaments. The coated filaments are then passed through a drier to evaporate the solvent.

e. Powder Spray Coating

Powder spray coating of the fibers by the matrix material particles can be accomplished using an electrostatic or tribostatic (tribocharging) spray gun. In its simplest design, an electrostatic spray gun is a tube with a charging electrode attached to a high-voltage generator. Powder particles are directed through the gun tube, typically by a forced air flow, and charged by the electrode. The charged powder particles are directed at the substrate, in this case the fibers, where they adhere to and coat the substrate. The substrate is grounded such that an opposite charge relationship is created between the charged powder particles and the substrate.

In the present invention, the electrostatic spray gun, which is contained within a powder chamber, which replaces the fluidized bed. The fibers leave the spreader and enter the powder chamber. Matrix material powder is fed to the spray gun where it is charged and directed at the fibers, which are grounded. Some charged powder particles adhere to and coat the fibers, while the remainder is recycled to the spray gun. The coated fibers exit the powder chamber and proceed to the oven.

The air flow through the spray gun, the powder flow input, and the electrostatic control are all variable and values are selected based primarily on the fiber and matrix material being used. For example, using a Ransburg-Gema AG unit type 701-6 electrostatic spray gun to coat 12K carbon fibers spread to 2 inches with less than 150 micron nylon 11 powder with some carbon black pigment, various settings can be used to accomplish coating. The Ransburg-Gema unit allows an air flow "level" of 0-7, a powder flow "level" of 0-10, and an electrostatic setting of 0--80 kV. The following Table I presents coating parameters and values.

TABLE I

| | Coating Values | | | |
|---|---|---|---|---|
| Line Speed (ft/min) | Air Flow level | Powder Flow level | Electrostatic setting (−kV) | % Matrix by weight |
| 11.8 | 1.5 | 4.5 | 25 | 34.8 |
| 20.7 | 2.0 | 6.0 | 15 | 41.0 |
| 27.5 | 2.0 | 10.0 | 7 | 43.5 |
| 45.5 | 2.0 | 10.0 | 7 | 30.0 |

8. Post-Coating Treatment of Towpregs to Form Flexible Fabric

After the filaments 13 have been wetout by the matrix forming material in the coating system 20, the towpreg 50 can be passed through an optional set of polishing rollers 46. These rollers 46 can be located within the oven 16 or melter or just after the exit of the oven 16 or melter, but, in any event, the rollers 46 must be located in a position on the apparatus 8 where the matrix forming material is still in the liquid state. The purposes of the polishing rollers 46 are to force the still liquid matrix forming material into the tow plies to help achieve better wetout and to reduce the surface friction of the plies due to droplets of matrix forming material being left on and solidifying on the surfaces of the tow plies.

After leaving the oven or melter, the towpreg 50 cools rapidly because the plies comprising the tow are thin. During cooling, it is important that the spread tow remain in sufficient tension such that the individual plies do not collapse onto each other and result in a mass of fibers and matrix material, which will result in a towpreg of high flexural rigidity. Also, it is important to not let the plies within the towpreg solidify in contact with each other, thus leading to a strong interply bond. An optional convective cooling method (not shown) located after the oven 16 would help keep the plies separated. Conductive cooling methods may be used as they require surface contact, which constrains the lateral motion of the tow. Splitting after cooling is possible with mechanical devices such as described above; however, it is inadvisable to rely on doing all of the splitting after the cooling, as this would cause too much fiber damage and loss. Towpregs typically must contain over about 25% matrix material by volume so as to form a sufficiently void-free composite structure suitable for processing into final composite structures.

The main purpose of the pinch rollers 14 is to drive the tow 11 through the process and to keep sufficient tension on the tow 11 to prevent the tow 11 from laterally collapsing onto itself. The various devices useful for pulling include driven pinch rollers, preferably rubber coated, and friction rollers, also preferably rubber coated.

Figure 10:
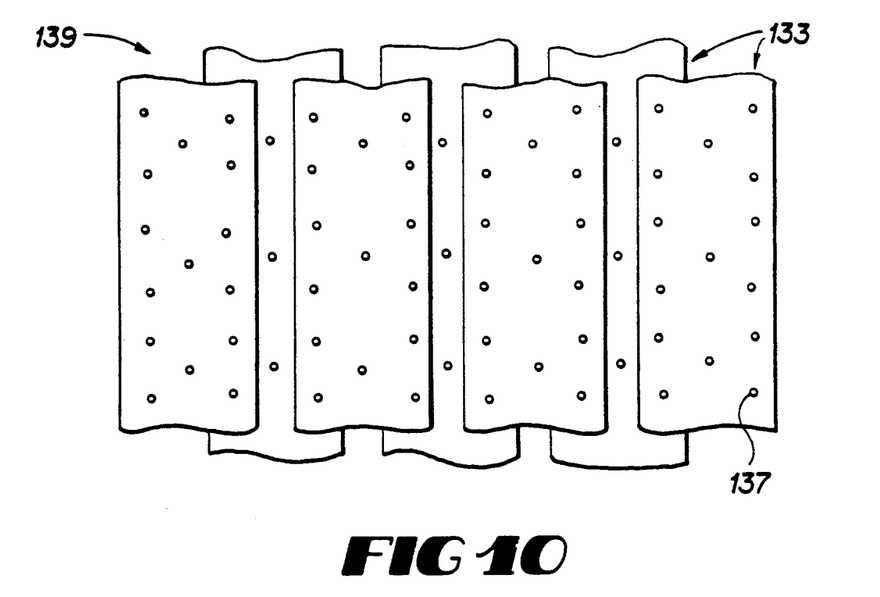
FIG. 10 is a top view of the unidirectional non-woven fabric shown in FIG. 8b indicating a typical point bonding pattern.

As or after the towpregs 133 are or have been cooled, the towpregs 133, as shown in FIGS. 8-11, are then arranged, either manually or mechanically, into a desired or proper configuration for producing a desired fabric 139. For example, the towpregs 133 can be arranged unidirectionally as shown in FIG. 8a, multidirectionally as shown in FIG. 9a, or in any directional relationship. The towpregs 133 then are overlayed and bonded together to form the non-woven, flexible, multiply towpreg fabric 139 of this invention. Various mechanisms are available for suitably bonding the towpregs 133 together. Hot melt bonding of the overlayed towpregs at selected points creates point bonds 137 resulting in a towpreg fabric. Various bonding patterns can be used, with the pattern shown in FIG. 10 shown for example purposes. Alternatively, stitching or weaving with a binder filament or yarn, needle punching, waterjet impingement or pressure point binding can be used to hold the towpregs 133 together. As shown in FIG. 11, stitches 138 result in a suitable fabric 139.

The towpregs 133 also can be formed into 3-dimensional non-woven fabrics, non-woven fabrics having complex contours, or 2-dimensional or 3-dimensional preforms by using a multiaxial layup mechanism. A take-up mandrel (not shown) can be configured to result in a fabric or preform of any desired configuration. The products of this invention are well-suited for fabricating a variety of composite structures. The fabric can be processed like tacky thermoset prepreg tape to layup advanced composite structures. The fabric can be used to make bonded preforms for resin transfer molding or compression molding. Tubular preforms can be made by tube rolling, a common process for fabricating golf club shafts, tennis rackets, and sailing masts.

In addition, a low cost 2-dimensional fabric can be produced for later downstream processing. In this regard, the products of this invention are less expensive than braided or woven fabrics produced from flexible multiply towpreg. Fabrics with matrices, which are solid at room temperature, can be flexible using this technology, whereas conventional technology leads to rigid fabrics. This invention achieves both flexibility and significant fiber wetout using a solid matrix. Fabric structures in which both the matrix and reinforcement are present as fibers, such as commingled, cobundled, or colayered structures, are flexible but do not exhibit any wetting of the reinforcing fibers. Therefore, these cofiber fabrics require more intensive fiber processing conditions to consolidate compared to this invention.

The above descriptions and examples have been offered for illustrative purposes only, and are not intended to limit the invention of the present application, which is as defined in the claims below.

What is claimed is:

1. A non-woven towpreg fabric comprising a plurality of flexible, multiply towpregs, comprising towpreg plies, said towpregs comprising reinforcing filaments and matrix forming material, said reinforcing filaments being substantially wet-out by said matrix forming material while said towpregs remain substantially unconsolidated, wherein said towpregs are arranged in overlapping layers comprising at least one towpreg and are bonded together resulting in said non-woven towpreg fabric.

2. The non-woven towpreg fabric as claimed in claim 1, wherein said layers of towpregs are overlapped in a unidirectional configuration.

3. The non-woven towpreg fabric as claimed n claim 1, wherein said layers of towpregs are overlapped in a multidirectional configuration.

4. The non-woven towpreg fabric as claimed in claim 1, wherein said towpregs are bonded together using hot melt bonding.

5. The non-woven towpreg fabric as claimed in claim 4, wherein said towpregs are hot melt bonded at selected points along the towpreg plies.

6. The non-woven towpreg fabric as claimed in claim 1, wherein said towpregs are bonded together using stitching.

7. The non-woven towpreg fabric as claimed in claim 1, wherein said towpregs are bonded together using needle punching.

8. The non-woven towpreg fabric as claimed in claim 1, wherein said towpregs are bonded together using pressure melting of the matrix forming material.

9. The non-woven towpreg fabric as claimed in claim 1, wherein said towpregs are bonded together using binder filament interleaving.

10. The non-woven towpreg fabric as claimed in claim 1, wherein said towpregs are bonded together using binder yarn interleaving.

11. A multidimensional preform fabricated from a non-woven towpreg fabric comprising a plurality of flexible, multiply towpregs, said towpregs comprising reinforcing filaments and matrix forming material, said reinforcing filaments being substantially wetout by said matrix forming material while said towpregs remain substantially unconsolidated, wherein said towpregs are arranged in overlapping layers comprising at least one towpreg and are bonded together in a desired configuration to form said preform.

12. The non-woven towpreg fabric as claimed in claim 11, wherein said towpregs have an average thickness less than 75 microns.

13. The non-woven towpreg fabric as claimed in claim 11, wherein said towpregs have an average thickness of between about 10 to 50 microns.

14. The non-woven towpreg fabric as claimed in claim 12, wherein said towpregs have an average thickness of between about 15 to 30 microns.

15. A composite article fabricated from a plurality of flexible, multiply towpregs, comprising towpreg plies, said towpreg plies comprising reinforcing filaments and matrix forming material, said reinforcing filaments being substantially wetout by said matrix forming material while said towpregs remain substantially unconsolidated, wherein said plurality of towpregs are arranged in a desired configuration and bonded together resulting in a contoured preform having the general configuration of said composite article, and said preform is further acted upon to form said composite article.

16. A method for the production of a non-woven towpreg fabric comprising a plurality of flexible, multiply towpregs, comprising towpreg plies, said towpreg plies comprising reinforcing filaments and matrix forming material, comprising the steps of:
(a) spreading said reinforcing filaments to expose individually substantially all of said reinforcing filaments;
(b) coating said reinforcing filaments with said matrix forming material in a manner causing interfacial adhesion of said matrix forming material to said reinforcing filaments;
(c) forming said towpreg plies by heating said matrix forming material contacting said reinforcing filaments until said matrix forming material liquefies and coats said reinforcing filaments;
(d) cooling said towpreg plies in a manner such that substantial cohesion between neighboring towpreg plies is prevented until said matrix forming material solidifies so as to form said flexible, multiply towpregs;
(e) overlapping layers comprising at least one of said towpregs in a manner such that a multilayer configuration of towpregs is formed; and
(f) bonding said overlapped towpregs together to form said non-woven towpreg fabric.

17. The method as claimed in claim 16, wherein said layers of towpregs are overlapped in a unidirectional configuration in step (e).

18. The method as claimed in claim 16, wherein said layers of towpregs are overlapped in a multidirectional configuration in step (e).

19. The method as claimed in claim 16, wherein said towpregs are bonded together using hot melt bonding in step (f).

20. The method as claimed in claim 16, wherein said towpregs are bonded together using stitching in step (f).

21. The method as claimed in claim 16, wherein said towpregs are bonded together using needle punching.

22. The method as claimed in claim 16, wherein said towpregs are bonded together using binder filament interleaving.

23. The method as claimed in claim 16, wherein said towpregs are bonded together using binder yarn interleaving.

24. The method as claimed in claim 16, wherein said spreading is lateral.

25. The method as claimed in claim 16, wherein steps (e) and (f) are repeated a plurality of times.

26. The method as claimed in claim 16, wherein step (c) is accomplished by pultrusion.

27. A method for the production of a multidimensional preform comprising a plurality of flexible, multiply towpregs, comprising towpreg plies, said towpreg plies comprising reinforcing filaments and matrix forming material comprising the steps of:
(a) spreading said reinforcing filaments to expose individually substantially all of said reinforcing filaments;
(b) coating said reinforcing filaments with said matrix forming material in a manner causing interfacial adhesion of said matrix forming material to said reinforcing filaments;
(c) forming said towpreg plies by heating said matrix forming material contacting said reinforcing filaments until said matrix forming material liquefies and coats said reinforcing filaments;
(d) cooling said towpreg plies in a manner such that substantial cohesion between neighboring towpreg plies is prevented until said matrix forming material solidifies so as to form said flexible, multiply towpregs;
(e) overlapping layers comprising at least one of said towpregs in a manner such that a multilayer configuration of towpregs is formed;
(f) arranging said towpregs into a desired preform configuration; and
(g) bonding said towpregs together so as to form said preform.

28. The method as claimed in claim 27, wherein steps (e), (f) and (g) are carried out in any order.

29. The method as claimed in claim 27, wherein any or all of steps (e), (f) and (g) are carried out simultaneously.

30. The method as claimed in claim 26, wherein steps (e), (f) and (g) are repeated a plurality of times.

31. The method as claimed in claim 27, wherein step (c) is accomplished by pultrusion.

* * * * *